US009123173B2

(12) United States Patent
Legakis et al.

(10) Patent No.: US 9,123,173 B2
(45) Date of Patent: Sep. 1, 2015

(54) METHOD FOR RASTERIZING NON-RECTANGULAR TILE GROUPS IN A RASTER STAGE OF A GRAPHICS PIPELINE

(75) Inventors: Justin S. Legakis, Sunnyvale, CA (US); Franklin C. Crow, Portola Valley, CA (US); John S. Montrym, Los Altos Hills, CA (US); Douglas A. Voorhies, Menlo Park, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 11/474,161

(22) Filed: Jun. 23, 2006

(65) Prior Publication Data

US 2007/0296726 A1    Dec. 27, 2007

(51) Int. Cl.
*G06T 1/20* (2006.01)
*G06T 11/40* (2006.01)

(52) U.S. Cl.
CPC . *G06T 11/40* (2013.01); *G06T 1/20* (2013.01); *G06T 2207/20016* (2013.01)

(58) Field of Classification Search
USPC .................................................. 345/426, 423
See application file for complete search history.

(56) References Cited

U.S. PATENT DOCUMENTS

| 4,208,810 | A | 6/1980 | Rohner et al. |
| 4,918,626 | A | 4/1990 | Watkins et al. |
| 5,543,935 | A | 8/1996 | Harrington |
| 6,160,557 | A | 12/2000 | Narayanaswami |
| 6,259,460 | B1 | 7/2001 | Gossett et al. |
| 6,323,874 | B1 | 11/2001 | Gossett |
| 6,480,205 | B1 | 11/2002 | Greene et al. |
| 6,611,272 | B1 | 8/2003 | Hussain et al. |
| 6,614,448 | B1 | 9/2003 | Garlick et al. |
| 6,717,576 | B1 | 4/2004 | Duluk, Jr. et al. |
| 6,734,861 | B1 | 5/2004 | Van Dyke et al. |
| 6,803,916 | B2 | 10/2004 | Ramani et al. |
| 6,938,176 | B1 | 8/2005 | Alben et al. |
| 6,956,579 | B1 * | 10/2005 | Diard et al. ............. 345/537 |
| 6,961,057 | B1 | 11/2005 | Van Dyke et al. |
| 7,002,591 | B1 | 2/2006 | Leather et al. |
| 7,061,495 | B1 | 6/2006 | Leather |
| 7,075,542 | B1 | 7/2006 | Leather |
| 7,218,317 | B2 * | 5/2007 | Liao et al. ............. 345/418 |
| 7,307,638 | B2 | 12/2007 | Leather et al. |
| 7,483,029 | B2 | 1/2009 | Crow et al. |
| 7,633,506 | B1 | 12/2009 | Leather et al. |
| 7,634,637 | B1 | 12/2009 | Lindholm et al. |
| 7,965,902 | B1 | 6/2011 | Zelinka et al. |
| 2002/0130863 | A1 | 9/2002 | Baldwin |

(Continued)

FOREIGN PATENT DOCUMENTS

| CN | 101093578 | 12/2007 |
| JP | 06180758 | 6/1994 |

(Continued)

*Primary Examiner* — Phi Hoang

(57) ABSTRACT

In a raster stage of a graphics pipeline, a method for rasterizing non-rectangular tile groups. The method includes receiving a graphics primitive for rasterization in a raster stage of a graphics processor. The graphics primitive is rasterized at a first level by generating a non-rectangular footprint comprising a set of pixels related to the graphics primitive. The graphics primitive is then rasterized at a second level by accessing the set of pixels and determining covered pixels out of the set of pixels. The raster stage subsequently outputs the covered pixels for rendering operations in a subsequent stage of the graphics processor.

18 Claims, 7 Drawing Sheets

(56) References Cited

U.S. PATENT DOCUMENTS

| | | |
|---|---|---|
| 2002/0145612 A1* | 10/2002 | Blythe et al. .................. 345/581 |
| 2003/0163589 A1 | 8/2003 | Bunce et al. |
| 2004/0085313 A1* | 5/2004 | Moreton et al. .............. 345/423 |
| 2004/0130552 A1 | 7/2004 | Duluk, Jr. et al. |
| 2005/0066148 A1* | 3/2005 | Luick ................................ 712/1 |
| 2005/0122338 A1 | 6/2005 | Hong et al. |
| 2006/0044317 A1 | 3/2006 | Bourd et al. |
| 2006/0209078 A1* | 9/2006 | Anderson et al. ............. 345/506 |
| 2006/0267981 A1* | 11/2006 | Naoi .............................. 345/426 |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024522 A1 | 1/2008 | Crow et al. |

FOREIGN PATENT DOCUMENTS

| | | |
|---|---|---|
| JP | 10-134198 | 5/1998 |
| JP | 11195132 | 7/1999 |
| JP | 2005182547 | 7/2005 |
| WO | 0013145 | 3/2000 |

\* cited by examiner

METHOD FOR RASTERIZING NON-RECTANGULAR TILE GROUPS IN A RASTER STAGE OF A GRAPHICS PIPELINE

CROSS REFERENCE TO RELATED APPLICATIONS

This application is related to, and incorporates by reference, the following commonly assigned U.S. Patent Applications:
A METHOD FOR PARALLEL FINE RASTERIZATION IN A RASTER STAGE OF A GRAPHICS PIPELINE, by Walt Steiner et al., filed on Jun. 23, 2006, Ser. No. 11/474,027; and
A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005.

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a vertex, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms and various rasterization methods have been developed for computing from a graphics primitive based description to a pixel based description (e.g., rasterizing pixel to pixel per primitive) in a way such that all pixels within the primitives comprising a given 3-D scene are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive.

Other traditional methods involve utilizing per pixel evaluation techniques to closely evaluate each of the pixels comprising a display and determine which pixels are covered by which primitives. The per pixel evaluation involves scanning across the pixels of a display to determine which pixels are touched/covered by the edges of a graphics primitive.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920×1200 pixels or larger. Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance while minimizing penalties such as increased power consumption and/or reduced fabrication yield.

In one embodiment, the present invention is implemented as a method for rasterizing non-rectangular tile groups in a raster stage of a graphics pipeline. The method includes receiving a graphics primitive for rasterization in a raster stage of a graphics processor unit (e.g., GPU). The graphics primitive is rasterized at a first level by generating a non-rectangular footprint comprising a set of pixels related to the graphics primitive. The graphics primitive is then rasterized at a second level by accessing the set of pixels and determining covered pixels out of the set of pixels. The raster stage subsequently outputs the covered pixels for rendering operations in a subsequent stage of the GPU.

In one embodiment, the rasterization at the first level and the rasterization at the second level is implemented on a per-clock cycle basis. A two part raster stage can be implemented such that the first level rasterization is implemented in a coarse raster unit and rasterizing at the second level is implemented in a fine raster unit.

In one embodiment, the non-rectangular footprint stamped out by the raster stage is dimensionally adjustable in accordance with a shape of the graphics primitive. For example, the non-rectangular footprint can be dimensionally adjusted (e.g., x number of tiles wide by y number of tiles long) to optimize a number of covered pixels comprising the footprint, such as when the non-rectangular footprint is dimensionally sized for an elongated triangle (e.g., from stencil shadow operations, etc.) to optimize the number of covered pixels.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
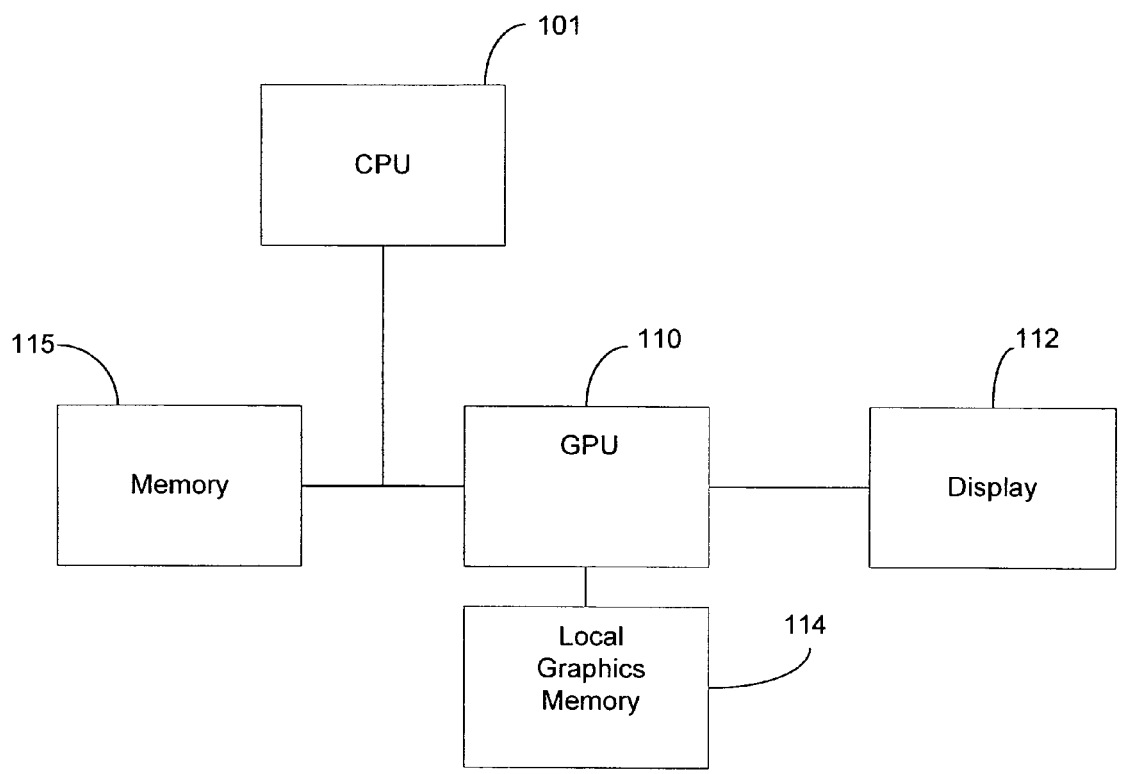
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.
Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.
Embodiments of the Invention Embodiments of the present invention implement a method and system for rasterizing non-rectangular tile groups in a raster stage of a graphics pipeline. Generally, the non-rectangular tile groups are in configurations other than, for example, squares (e.g., 4×4, 8×8, 16×16 titles, etc.) or rectangles (e.g., 4×8, 8×16 titles, etc.). The method includes receiving a graphics primitive (e.g., triangle polygon) for rasterization in a raster stage of a graphics processor (e.g., GPU 110 of FIG. 1). Embodiments of the present invention can implement a multilevel rasterization process.

In one embodiment, the graphics primitive is rasterized at a first level by generating a non-rectangular footprint comprising a set of pixels related to the graphics primitive (e.g., a tile group that covers the primitive). The graphics primitive is then rasterized at a second level by accessing the set of pixels (e.g., the tile group that covers the primitive) and determining covered pixels out of the set. For example, even though the tile group may cover the primitive, not all pixels comprising each tile may cover, or reside within, the graphics primitive. The result of this two level rasterization is pixels that cover, or reside within, the graphics primitive. The raster stage subsequently outputs the covered pixels for rendering operations in a subsequent stage of the graphics processor.

Figure 2:
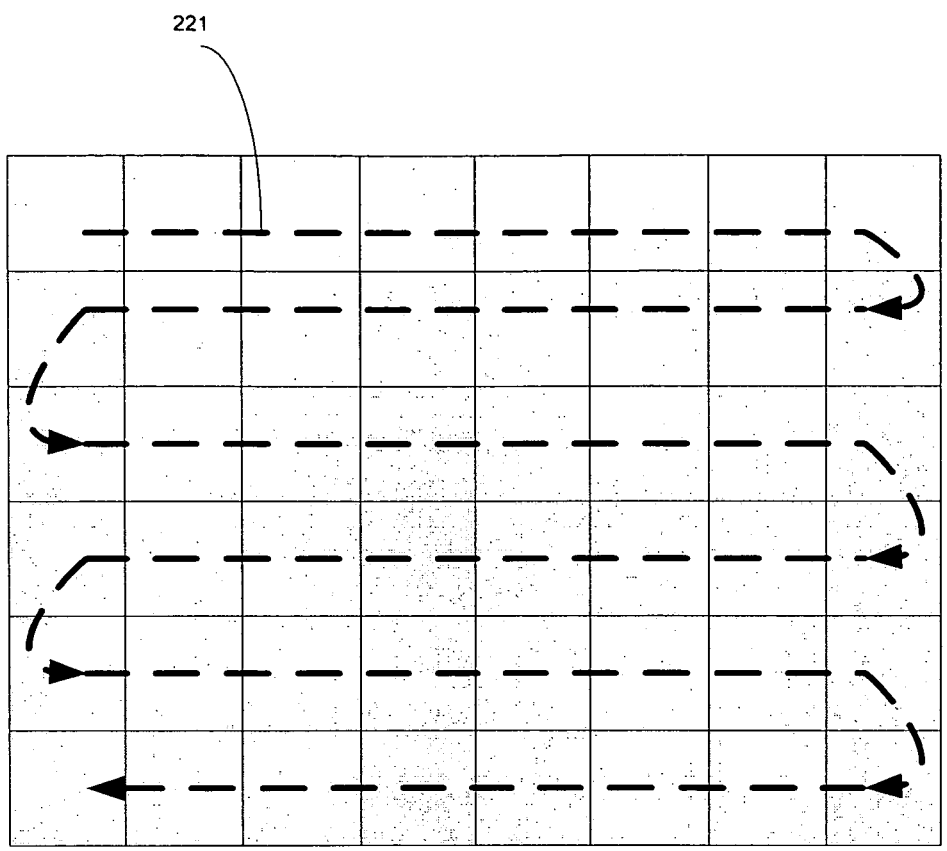
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive. As depicted in FIG. 2, the boustrophedonic pattern is indicated by the dotted line 221. In such an embodiment, each pixel, or block of pixels, of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small.

Referring still to FIG. 2, a boustrophedonic pattern for visiting the areas of the screen covered when rasterizing a large primitive (e.g., triangles, etc.) has advantages for maintaining a cache of relevant data and reducing the memory requests required for frame buffer and texture access. For example, generating pixels that are near recently generated pixels is important when recent groups of pixels and/or their corresponding texture values are kept in memories of a limited size (e.g., cache memories, etc.).

Additional details regarding boustrophedonic pattern of rasterization can be found in U.S. Patent Application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing non-rectangular tile groups can be readily applied to traditional left-to-right, line-by-line rasterization patterns.

Figure 3:
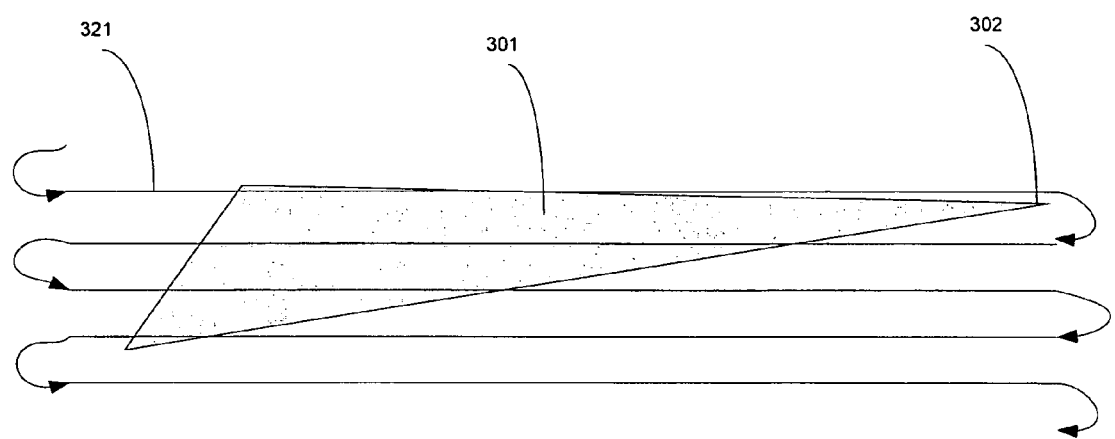
FIG. 3 shows a diagram of a triangle polygon against a rasterization pattern for a raster unit of a GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention.

As described above, the line 321 shows a boustrophedonic pattern of traversal, where the raster unit visits all pixels on a 2D area of the triangle 301 by scanning along one axis as each pass moves farther along on the orthogonal axis. In the FIG. 3 embodiment, this initial rasterization pattern is performed at the first level, or at a coarse rasterization level. A coarse raster unit of the GPU 110 traverses the triangle 301 and stamps out tile groups that cover the triangle 301. These tile groups can be symmetrical (e.g., square, rectangular, etc.) in those cases where the triangle 301 is large in comparison to the size of the tile groups and the coarse raster unit is rasterizing pixels well within the interior of the triangle 301. These tile groups can also be non-rectangular in those cases where the triangle 301 is small in comparison to the size of the tile groups and the coarse raster unit is rasterizing pixels near the elongated point of the triangle 301 (e.g., point 302). Generally, the non-rectangular tile groups are in configurations other than, for example, squares (e.g., 4×4, 8×8, 16×16 titles, etc.) or rectangles (e.g., 4×8, 8×16 titles, etc.). As used herein, it should be noted that the term "non-rectangular groups" refers to the attribute whereby groups of tiles that are rasterized in a raster stage are not limited to rectangular or square arrays. Non-rectangular tile groups can be in arbitrary arrangements. For example, in one embodiment, a non-rectangular tile group can include tiles which are not even contiguous with one another.

Figure 4:
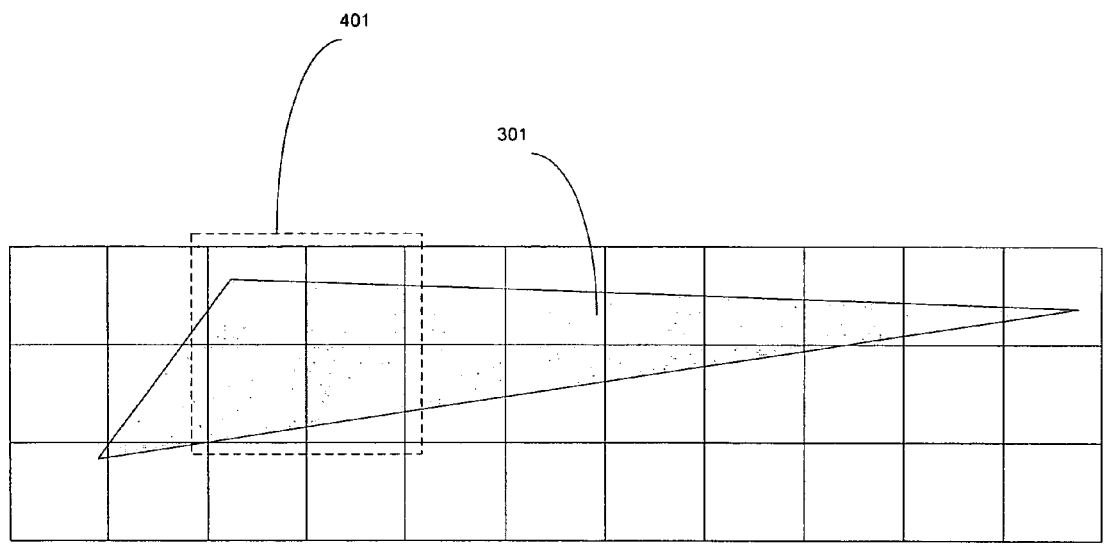
FIG. 4 shows a diagram of the triangle against a grid of tiles as they are being examined by the first level rasterization process in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 8×8, 16×16, etc.). FIG. 4 shows a case where the first level rasterization produces coarse rasterization tile groups comprised of four tiles each, such as the exemplary tile group 401.

As described above, in one embodiment, the first level rasterization generates a tile group, or footprint (e.g., footprint 401) comprising a set of pixels related to the graphics primitive (e.g., a tile group that covers the primitive). Generally, the first level rasterization is intended to quickly determine which pixels of the screen area relate to a given graphics primitive. Accordingly, relatively large groups of pixels (e.g., tiles) are examined at a time in order to quickly find those pixels that relate to the primitive. The process can be compared to a reconnaissance, whereby the coarse raster unit quickly scans a screen area and finds tile groups that cover the triangle 301. Thus the pixels that relate to the triangle 301 can be discovered much more quickly than the traditional prior art process which utilizes a single level of rasterization and examines much smaller numbers of pixels at a time, in a more fine-grained manner.

In the FIG. 4 embodiment, the first level rasterization utilizes a four-tile footprint (e.g., footprint 401) wherein each tile group, or footprint, includes four tiles. Hence, first level rasterization will stamp out four-tile footprints where each footprint has at least one pixel covered by the triangle 301. Thus, first level rasterization is referred to as coarse rasterization since large groups of pixels are examined at a time.

Figure 5:
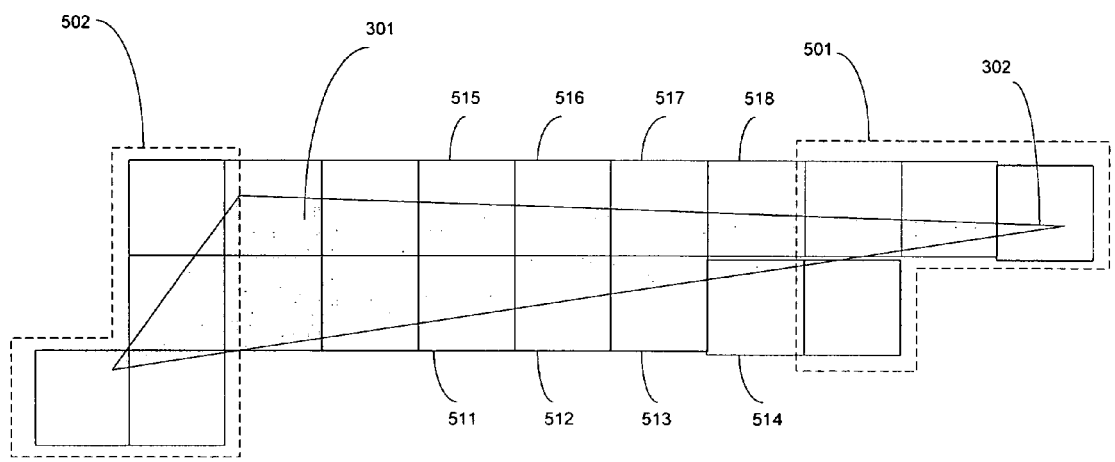
FIG. 5 shows a diagram depicting a plurality of tile groups as stamped out by a coarse raster unit in accordance with one embodiment of the present invention.

FIG. 5 shows a diagram depicting a plurality of tile groups as stamped out by a coarse raster unit in accordance with one embodiment of the present invention. Exemplary tile groups 501 and 502 are shown.

The FIG. 5 the embodiment shows the manner in which the coarse raster stage generates non-rectangular tile groups in order to optimize the degree of coverage of the triangle 301. As described above, a non-rectangular footprint can be used to more efficiently determine which tiles of a screen area are related to a given graphics primitive. The graphics primitive is then rasterized at a second level by accessing the generated tile groups and determining covered pixels out of these tile groups. For example, even though the tile group may cover the primitive, not all pixels comprising each tile may cover, or reside within, the graphics primitive.

FIG. 5 shows exemplary non-rectangular tile groups 501 and 502. The tile groups, or footprints 501-502, are non-rectangular in that their constituent tiles are not arranged in a box or rectangle fashion. In the case of the footprints 501-502, their constituent tiles are stamped out in an "L" pattern as shown. This non-rectangular pattern optimizes the number of covered pixels within the footprints 501-502.

FIG. 5 also shows tiles 511-518. Depending upon their degree of coverage, a raster stage in accordance with one embodiment of the present invention can stamp out tiles 515-518 into a single rectangular tile group (e.g., along the upper edge of the triangle 301) and stamp out tiles 511-514 into a similar rectangular tile group (e.g., along the lower edge of the triangle 301). In this manner, groups of four tiles can be assembled in conglomerations irrespective of their symmetry. The conglomerations can be L-shaped, straight-line, square, or the like. The dimensions of the conglomeration of tiles is adjusted in order to optimize the number of covered pixels within the conglomeration.

It should be noted that different numbers of tiles can be implemented in the first level coarse rasterization process. For example, instead of four tiles per footprint, six, eight, or more tiles can be utilized. With such large footprints, the tiles can be combined in a variety of different shapes and in a variety of different patterns in order to best cover a given graphics primitive.

In this manner, the non-rectangular footprint (e.g., footprint 501) stamped out by the raster stage is dimensionally adjustable in accordance with a shape of the graphics primitive (e.g., triangle 301). For example, the non-rectangular footprint can be dimensionally adjusted (e.g., x number of tiles wide by y number of tiles long) to optimize a number of covered pixels comprising the footprint. This attribute is especially useful in those cases where the primitive being rendered is exceptionally long and narrow. Such long narrow triangles commonly arise in applications such as, for example, stencil shadow algorithms. For example, in a case where the triangle 301 is a very long narrow triangle, the number of pixels comprising each tile, and the number of tiles comprising the footprint, can be optimized in order to stamp out footprints having a high proportion of covered pixels. This is especially useful when rasterizing pixels near the point (e.g., point 302) of the triangle.

Figure 6:
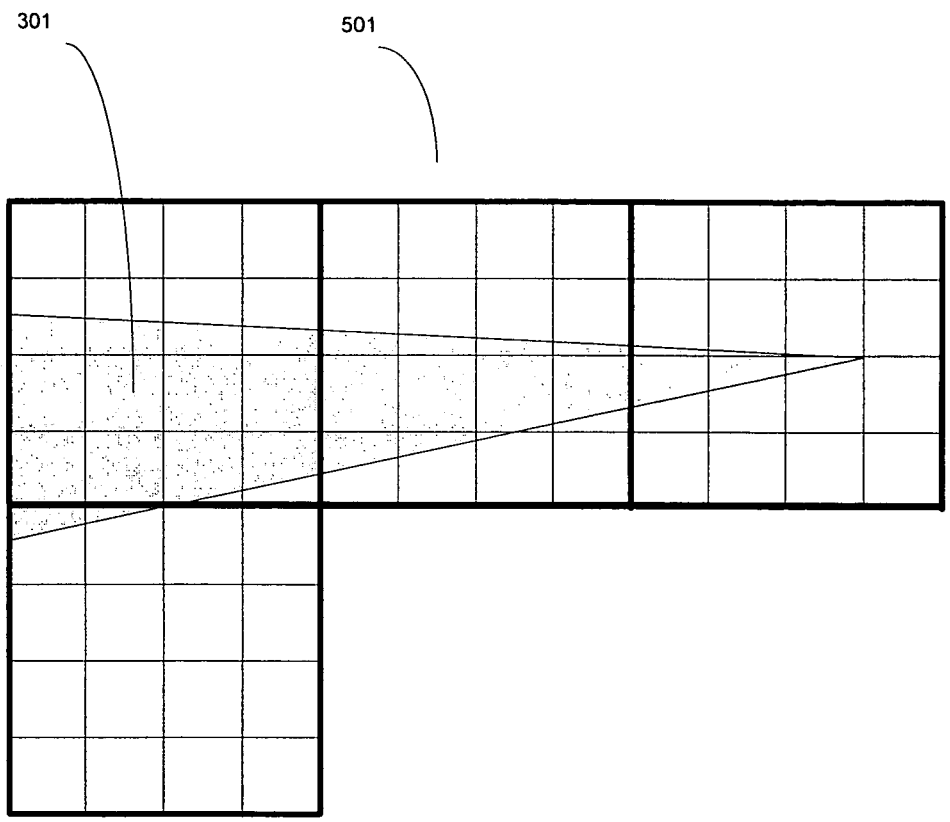
FIG. 6 illustrates the footprint as it is rasterized using a second level rasterization process in accordance with one embodiment of the present invention.

FIG. 6 illustrates the footprint 501 as it is rasterized using a second level rasterization process in accordance with one embodiment of the present invention. As described above, after coarse rasterization, the triangle 501 is then rasterized at a second level by accessing the set of pixels of the footprint 501 (e.g., the pixels comprising the tile group 501) and determining covered pixels out of the set. For example, even though the footprint 501 covers the triangle 301, not all pixels comprising each tile may cover, or reside within, the graphics primitive.

The second level rasterization, or fine rasterization, now stamps out the individual covered pixels of the footprint 501. The fine rasterization process examines the pixels comprising the footprint 501 and determines which of those pixels are covered by the triangle 301. This is shown in FIG. 6 as the grid of 16 pixels (e.g., 4×4) comprising each tile of the footprint 501. Each of the 16 pixels of each tile are evaluated against the edges of the triangle 301. Depending upon the degree of accuracy desired, multiple sample points of each the pixel can be used in the evaluation. The result of the evaluation is the designation of the pixels of the footprint 501 that are covered by the polygon 301. The covered pixels are then output from the fine rasterization unit for further processing within subsequent stages of the GPU 110.

Figure 7:
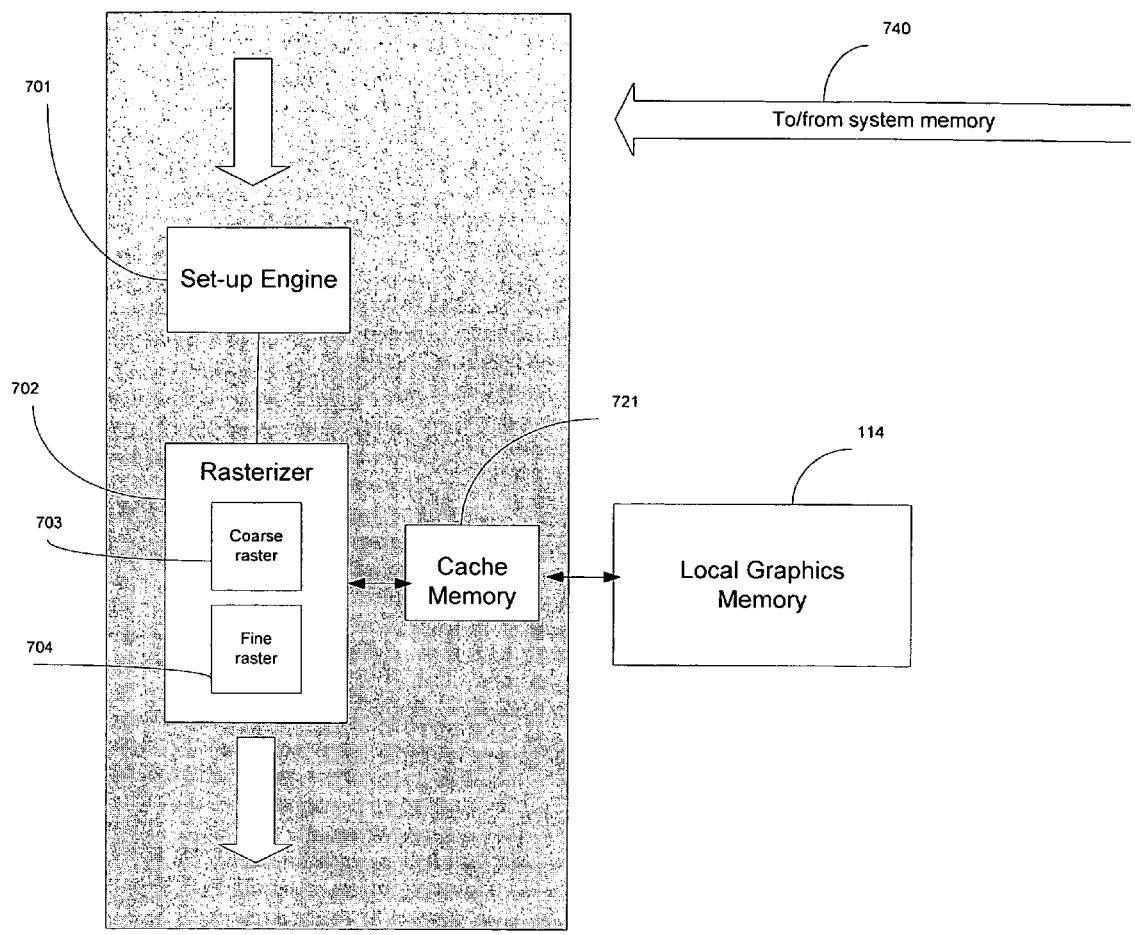
FIG. 7 shows a diagram of internal components of the GPU in accordance with one embodiment of the present invention.

FIG. 7 shows a diagram of internal components of the GPU 110 in accordance with one embodiment of the present invention. As shown in FIG. 7, the GPU 110 includes a setup engine 701 and a rasterizer unit 702. In the present embodiment, the functionality of the present invention is implemented within the hardware and software of the rasterizer unit 702. The set up unit 701 functions by converting descriptions based on vertices to descriptions based on edge descriptions. The rasterizer unit 702 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In the present embodiment, the rasterizer unit 702 includes a coarse raster component 703 and a fine raster component 704. The coarse raster component 703 implements the non-rectangular tile group rasterization process as described above, as it rapidly searches a grid of tiles to identify tiles of interest (e.g., tiles that are covered by a primitive). Once the tile groups of interest are identified, the fine raster component 704 individually identifies the pixels that are covered by the primitive. Hence, in such an embodiment, the coarse raster component 703 rapidly searches a grid of pixels by using tiles, and the fine raster component 704 uses the information generated by the coarse raster component 703 and implements fine granularity rasterization by individually identifying pixels covered by the primitive. In both cases, both the coarse raster component 703 and the fine raster component 704 can utilize one or more boustrophedonic patterns during their rasterization.

Referring still to FIG. 7, the GPU 110 further includes a cache memory 721 that functions by implementing high-speed low latency storage for the most frequently used graphics rendering data. Such data typically comprises texture information, vertex information, colors, and the like. The cache memory 721 is shown coupled to the local graphics memory 114. The cache memory 721 utilizes one or more cache maintenance mechanisms to maintain coherency with the local graphics memory 114. The arrow 740 shows the communications pathway between the GPU 110 and the system memory (e.g., memory 115 shown in FIG. 1).

In one embodiment, the hardware comprising the raster unit 702 is optimized for operations on a per clock basis. For example, to provide high throughput and thereby maintain high rendering frame rates, the coarse raster component 703 and the fine raster component 704 comprise hardware designed to implement the first level rasterization and the second level rasterization on a per-clock cycle basis. The rasterizer unit 702 can be implemented such that the first level rasterization is implemented in the coarse raster component 703 that "stamps out" tile groups (e.g., including non-rectangular tile groups) covering a given primitive within a single clock cycle. Subsequently, the rasterization at the second level is implemented in the fine raster component 704 that stamps out the covered pixels of a tile group in a single clock cycle. Thus for example, hardware that can process 64 pixels per clock would use a 64 pixel footprint (e.g., four tiles of 16 pixels each) while hardware that can process 128 pixels per clock would use a 128 pixel footprint (e.g., eight tiles of 16 pixels each, four tiles of 32 pixels each, etc.). As described above, these tiles can be arranged in various different conglomerations (e.g., long skinny footprints, square footprints, rectangular footprints, diagonal footprints, "L" shaped footprints, and the like).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a raster stage of a graphics pipeline, a method for rasterizing non-rectangular tile groups comprising:
    receiving a graphics primitive for rasterization in a raster stage of a graphics processor;
    rasterizing the graphics primitive at a first level by, in a single clock cycle, generating a non-rectangular group of tiles comprising a non-symmetrical conglomeration of pixels related to the graphics primitive;
    rasterizing the graphics primitive at a second level by accessing the set of pixels and determining covered pixels out of the set of pixels based on the non-rectangular group of tiles, wherein a first number of clock cycles is used to determine the covered pixels using the non-rectangular group of tiles but a second number of clock cycles would be used to determine the covered pixels if using a rectangular group of tiles, and wherein the first number of clock cycles is less than the second number of clock cycles; and
    outputting the covered pixels for rendering operations in a subsequent stage of the graphics processor, wherein rasterizing at the first level is implemented in a coarse raster unit and rasterizing at the second level is implemented in a fine raster unit.

2. The method of claim 1 wherein the rasterizing at the second level is implemented on a per clock cycle basis.

3. The method of claim 1 wherein the coarse raster unit is configured to traverse a plurality of pixels of an image using a boustrophedonic pattern.

4. The method of claim 1 wherein the non-rectangular group of tiles is dimensionally adjustable in accordance with a shape of the graphics primitive.

5. The method of claim 4 wherein the non-rectangular group of tiles is dimensionally adjustable to optimize a number of covered pixels out of the set of pixels comprising the non-rectangular group of tiles.

6. The method of claim 5 wherein the non-rectangular group of tiles is dimensionally sized for an elongated triangle graphics primitive to optimize the number of covered pixels comprising the non-rectangular group of tiles.

7. A GPU (graphics processor unit), comprising:
    a set-up unit for generating polygon descriptions;
    a rasterizer unit coupled to the set-up unit for rasterizing the polygon descriptions;
    a coarse raster unit within the rasterizer unit for rasterizing a graphics primitive at a first level by, in a single clock cycle, generating a non-rectangular group of tiles comprising a non-symmetrical conglomeration of pixels related to the graphics primitive; and
    a fine raster unit within the rasterizer unit for rasterizing the graphics primitive at a second level by accessing the set of pixels and determining covered pixels out of the set of pixels, wherein a first number of clock cycles is used to determine the covered pixels using the non-rectangular group of tiles but a second number of clock cycles would be used to determine the covered pixels if using a rectangular group of tiles, and wherein the first number of clock cycles is less than the second number of clock cycles.

8. The GPU of claim 7 wherein the rasterizing at the first level is implemented on a per clock cycle basis.

9. The GPU of claim 7 wherein the rasterizing at the second level is implemented on a per clock cycle basis.

10. The GPU of claim 7 wherein the coarse raster unit is configured to traverse a plurality of pixels of an image using a boustrophedonic pattern.

11. The GPU of claim 7 wherein the non-rectangular group of tiles is dimensionally adjustable in accordance with a shape of the graphics primitive.

12. The GPU of claim 11 wherein the non-rectangular group of tiles is dimensionally adjustable to optimize a number of covered pixels out of the set of pixels comprising the non-rectangular group of tiles.

13. The GPU of claim 12 wherein the non-rectangular group of tiles is dimensionally sized for an elongated triangle graphics primitive to optimize the number of covered pixels comprising the non-rectangular group of tiles.

14. A computer system, comprising:
    a system memory;
    a central processor unit coupled to the system memory; and
    a graphics processor unit communicatively coupled to the central processor unit;
    a set-up unit within the graphics processor unit for generating polygon descriptions;
    a rasterizer unit within the graphics processor unit and coupled to the set-up unit for rasterizing the polygon descriptions; and
    a coarse raster component within the raster unit, wherein the coarse rasterizer component is configured to receive a graphics primitive for rasterization from the setup unit, rasterize the graphics primitive at a first level by, in a single clock cycle, generating a non-rectangular group of tiles comprising a non-symmetrical conglomeration of pixels related to the graphics primitive, rasterize the graphics primitive at a second level by accessing the set of pixels and determining covered pixels out of the set of pixels, and output the covered pixels for rendering operations in a subsequent stage of the graphics processor unit, wherein a first number of clock cycles is used to determine the covered pixels using the non-rectangular group of tiles but a second number of clock cycles would be used to determine the covered pixels if using a rectangular group of tiles, and wherein the first number of clock cycles is less than the second number of clock cycles.

15. The computer system of claim 14 wherein the rasterizing at the first level and the rasterizing at the second level is implemented on a per clock cycle basis.

16. The computer system of claim 14 wherein the non-rectangular group of tiles is dimensionally adjustable to optimize a number of covered pixels out of the set of pixels comprising the non-rectangular group of tiles.

17. The computer system of claim 14 wherein the non-rectangular group of tiles includes tiles that are not contiguous with one another.

18. The computer system of claim 17 wherein the non-rectangular group of tiles comprises a non-symmetrical conglomeration of pixels related to the graphics primitive.

* * * * *